United States Patent [19]
Piccolo et al.

[11] 3,811,908
[45] May 21, 1974

[54] PROCESS FOR THE MANUFACTURE OF TITANIUM DIOXIDE PIGMENTS

[75] Inventors: Luigi Piccolo; Benedetto Calcagno, both of Milan; Marcello Ghirga, Bresso, all of Italy

[73] Assignee: Societa Italiana Resine S.I.R. S.p.A., Milan, Italy

[22] Filed: Aug. 3, 1972

[21] Appl. No.: 277,548

[30] Foreign Application Priority Data
Nov. 17, 1971 Italy.................................. 31197/71

[52] U.S. Cl.............. 106/300, 106/308 Q, 423/612, 423/613, 23/277
[51] Int. Cl............................................. C09c 1/36
[58] Field of Search ............ 106/300; 423/612, 613

[56] References Cited
UNITED STATES PATENTS
3,661,522  5/1972  Colombo et al. .................... 106/300
3,524,818  8/1970  Bramekamp et al................ 423/613

Primary Examiner—Delbert E. Gantz
Assistant Examiner—J. V. Howard
Attorney, Agent, or Firm—Sughrue, Rothwell, Mion, Zinn & Macpeak

[57] ABSTRACT

Fluid organic complexes of aluminium trichloride with hydrocarbons are used as nucleants and rutilising agents in the vapor phase oxidation of titanium tetrachloride to give titanium dioxide pigments.

5 Claims, 2 Drawing Figures

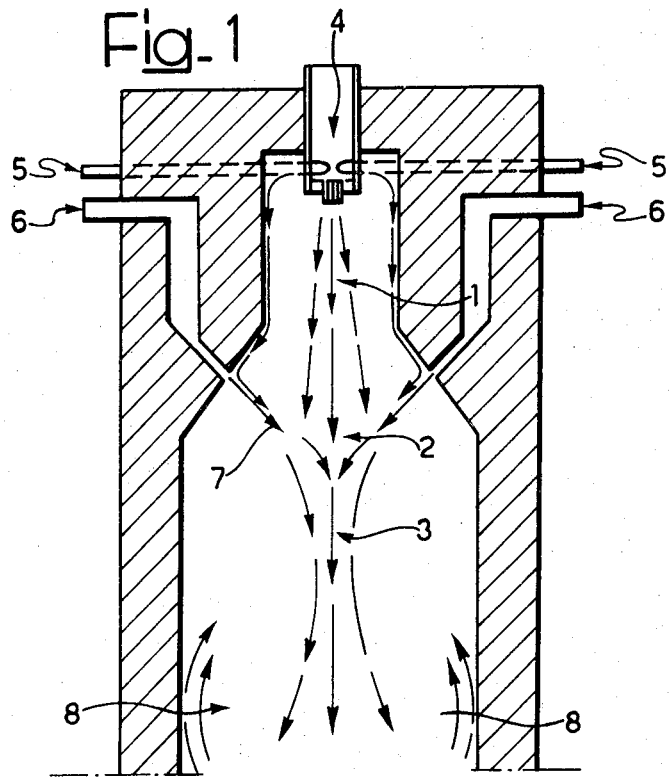
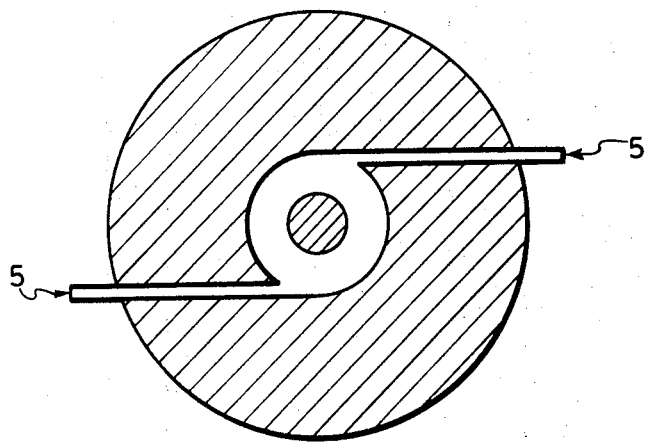

PROCESS FOR THE MANUFACTURE OF TITANIUM DIOXIDE PIGMENTS

The present invention relates to the manufacture of titanium dioxide pigments, and more particularly to a new method of producing high quality rutile pigments.

More precisely, the present invention relates to a new method of monitoring the formation of titanium dioxide in the crystalline rutile form by using a new rutilising and nucleant agent in the vapour phase oxidation of a titanium halide such as titanium tetrachloride, for example.

The characteristics which the titanium dioxide must exhibit in order to be advantageously used as a pigment are:

crystalline rutile structure;
uniform granulometry with a mean particle diameter of approximately 0.2 microns;
absence of aggregates among the particles.

The nature of the reaction which takes place between oxygen and titanium tetrachloride in the vapor phase at a temperature between 800° and 1,400°C is such that when appropriate rutilising and nucleant centres are provided, the percentage of rutile increases until it attains approximately 100 percent, and at the same time there is an improvement in the uniformity of the granulometry of the product.

It is therefore evident that in order to obtain a high quality pigment, a basic requirement is to select suitable rutilising and nucleant agents.

In the prior art, it was known to add water vapor to the gaseous reaction medium in order to improve uniformity of granulometry in aluminium titanium dioxide produced.

Furthermore, it was known to produce pigments having high percentages of rutile by using aluminium trichloride as the rutilising agent. The small percentages of aluminum oxide which are found in the end product do not have any effect on the quality of the pigment. The aluminium chloride is supplied to the reaction zone in the gaseous phase, alone or in mixture with titanium tetrachloride vapor.

The great disadvantages encountered when using aluminium trichloride as the rutilising agent in such processes are due to the fact that it is used in powder form in order to be sublimated, so that its supply is not a very easy matter.

Furthermore, in view of the fact that the systems of measuring out solids, normally used in the art, such as screw type or jolting dispensers, do not permit of constant dispensing of the solid, it is very difficult continuously to introduce constant and monitored quantities of aluminium chloride into the reaction zone.

In view of the difficulties of constant and monitored dispensing of the aluminium chloride, there cannot be adequate control of the formation of titanium dioxide and therefore of the characteristics of the pigment, such as the percentage of rutile and the uniformity of the granulometry.

In other words: it becomes scarcely possible to reproduce the result.

An object of the present invention is to overcome the drawbacks inherent in the processes used in the prior art in order to produce titanium dioxide pigments by vapor phase oxidation of titanium tetrachloride, and to provide a new and efficient method of achieving this purpose. A specific object of the present invention is to permit monitoring of rutilization and nucleation of the titanium dioxide, and thus of the characteristics of the pigment obtained.

Another object of the present invention is to provide a new agent for use in such a process as a simultaneous rutilizing and nucleant agent and having such a form as will permit its ready supply and constant metering. Further objects of the present invention will become manifest from the following description.

We have found that the aforesaid and other objects are achieved by the process according to the present invention, which resides essentially in the preparation of high quality rutile pigments of controlled characteristics by vapor phase oxidation of titanium tetrachloride, an organic complex of aluminium trichloride with hydrocarbons or mixtures thereof being used as the nucleant and rutilizing agent.

Such organic complexes of aluminium trichloride take fluid form at room temperatures and can therefore be supplied by being pumped at a constant rate of flow in the form of an atomised or preferably vaporized liquid to the reaction zone, possibly in mixture with the titanium tetrachloride vapor.

Without wishing to confine ourselves to any particular theory, we feel it is reasonable to attribute the rutilizing effect of such organic complexes to the aluminium trichloride contained in them, and to attribute the nucleant action to one or more of the products of combustion of the organic part thereof.

Since the percentage of aluminium trichloride in such organic complexes varies over a wide range with a variation in the nature of the hydrocarbons used in forming the complex, to use one definite organic complex of aluminium trichloride as a nucleant and rutilizing agent in vapor phase oxidation of titanium tetrachloride involves choosing a certain ratio of rutilizing agent to nucleant in order to impart definite characteristic features to the titanium dioxide.

Therefore, for the purposes of the present invention, all the possible fluid organic complexes of aluminium trichloride with hydrocarbons or mixtures of these are useful, the choice of a particular complex being based on the particular characteristics which it is intended to impart to the rutile pigments.

We have found that the best results are obtained when one of the organic complexes of aluminium trichloride with hydrocarbons or mixtures of these latter, having between 15 and 68 percent by weight of aluminium trichloride, is used as the nucleant and rutilizing agent in the vapor phase oxidation of titanium tetrachloride. More precisely, the process of the present invention consists in preparing high quality rutile pigments having controlled characteristics by, at a temperature comprised in the range from 800° to 1,400°C, bringing titanium tetrachloride into contact with oxygen, supplied in quantities such that the molar ratio of oxygen to titanium tetrachloride is comprised in the range from 1.15:1 to 1.4:1, in the presence of an organic complex of aluminium trichloride, preferably chosen from those having a percentage of aluminium trichloride of between 30 and 65 percent by weight, supplied in such a quantity that the proportion by weight of aluminium chloride with respect to the titanium tetrachloride is between 0.5 and 3.5:1. The organic complexes of aluminium trichloride are already known in the art, in that they are normally used as catalysts in processes of the Friedel-Crafts type, and are prepared either simply by adding the finely subdivided aluminium trichloride to the hydrocarbon or to the mixture of hydrocarbons, or by treating with gaseous hydrogen chloride suspension of aluminium in the hydrocarbon or mixture of hydrocarbons so as to produce the aluminium trichloride in situ. The second of these production methods is the more advantageous since it makes it possible to avoid the direct use of aluminium trichloride, which is a costly product difficult to handle.

According to this method, the working temperature is comprised between room temperature and 50°C, because at higher temperatures, secondary reactions occur which lead to destruction of the complex.

Hydrogen chloride is supplied at a rate such that not more than 7 to 10 percent of the original hydrogen chloride is left in the effluent gas.

The aluminium used in the said process is generally in powder form and the hydrocarbon or the mixture of hydrocarbons is or are normally used in excess with respect to the quantity needed to form the complex. For the purposes of the present invention, all the hydrocarbons or mixtures thereof which form fluid complexes with aluminium trichloride, such as, for example: toluene, ethylbenzene, butylbenzene, isopropylbenzene, alkylbenzenes having a number of carbon atoms in the lateral chain of 12 to 16, polyalkyl benzenes, and mixtures thereof, may be used.

For the purposes of the present invention, it is also possible advantageously to use the spent catalytic sludge discharged from aromatic hydrocarbon alkylation reactors, when aluminium trichloride is used as the catalyst. Generally, such sludge contains between 25 and 35 percent by weight of aluminium trichloride and costs virtually nothing. The titanium dioxide obtained according to the process of the present invention is discharged from the reactor and separated from the gaseous by-products of oxidation and from any inert gases such as nitrogen. After such separation, the titanium dioxide is subjected to the usual treatments, comprising a grinding treatment, in order to obtain high quality pigments. The pigment obtained by the process of the present invention proves to have a uniform granulometry comprised between 0.15 and 0.35 microns and to consist of 100 percent rutile, which is why it may be advantageously used in all the applications of the pigments.

The advantages of the process according to the present invention are represented by the high quality of the rutile pigments obtained and by the reproducibility of the results.

Such advantages can be attributed essentially to the fact that the nucleant and rutilizing agent used according to the process of the present invention is a complex of well-defined composition, therefore the ratio of rutilizing agent to nucleant is always constant.

Furthermore, the fluid form of the organic complex of aluminium trichloride allows it to be measured out constantly, so that, also, the ratios of titanium tetrachloride to rutilizing agent and titanium tetrachloride to nucleant are always constant.

For clearer understanding of the invention, some examples will now be listed, which have purely an illustrative significance; they must not therefore be understood as limiting the invention.

EXAMPLE 1

For the oxidation of titanium tetrachloride to titanium dioxide, a reactor was used of the type shown diagrammatically in the attached FIGS. 1 and 2. FIG. 1 more particularly shows in diagrammatic cross-section the reaction chamber comprising the combustion zone 1, the reagent blending zone 2 and the titanium tetrachloride oxidation zone 3.

Located in the upper part of the combustion zone 1 is the burner 4 for combustion of the auxiliary fuel.

The combustion zone 1 is of cylindrical shape and is of such a height that the flame is substantially completely exhausted prior to contact with the titanium tetrachloride.

Referring again to FIG. 1, the titanium tetrachloride is supplied through 6 and is passed, in the blending zone 2, through the annular aperture provided in the wall of the frustoconical zone, the said aperture being located in a position approximately at right-angles to the wall itself.

The cold oxygen is supplied through the two pipes 5, and this detail is shown in FIG. 2 which represents a cross-section through the reaction chamber in the oxidising gas supply zone.

By means of this particular supply, the flow of oxidising gas develops and remains clinging to the wall as far as the zone in which it is blended with titanium tetrachloride.

In particular, the burner 4 is supplied with 22.4 N.cu.m. per hour of carbon monoxide containing small quantities of hydrogen, and 17 N.cu.m./hr. of oxygen.

Oxygen is supplied through the pipes 5 at the rate of 47 N.cu.m. per hour. When the working temperature is reached, equal to approximately 1,200°C, the titanium tetrachloride, preheated to 400°C, is supplied through 6, in a quantity equal to 320 kg/hr., together with an organic vapourised complex of aluminium trichloride with hydrocarbons in a quantity equal to 13.2 kg/hr.

This organic complex was prepared by supplying hydrochloric acid to a suspension consisting of powdered metallic aluminium in alkyl benzenes with a lateral paraffin chain containing 12 to 16 carbon atoms. During this preparation, the working temperature was 40°C, and the result was a complex with an aluminium trichloride content equal to 47 percent by weight. The fluid complex thus prepared was supplied by a dispensing pump to an evaporator maintained at 400°C so as to cause its instant vapourisation and the vapors were passed to the reaction chamber together with those of the titanium tetrachloride.

The products discharged from the reaction chamber, consisting of titanium dioxide and small quantities of hydrogen chloride were cooled to 300°C approximately by being brought into contact with cooled recycled gases.

The titanium dioxide was then separated from the gases and subjected to inspection in order to determine its characteristics.

When the titanium dioxide was observed under the electron microscope, it was noted that the product consisted of particles of rounded shape and exceptionally uniform in diameter, which was equal to 0.23 microns. The rutile content proved to be equal to 100 percent and the obscuring power, determined by the Reynolds' method, proved equal to 1,975.

EXAMPLE 2

The experiment was carried out by using the same procedures as in Example 1, the rutilizing agent and nucleant used being an organic complex of aluminium trichloride with alkyl benzenes having 12 to 16 carbon atoms in the lateral chain, obtained as described in Example 1, containing 30 percent aluminium trichloride and supplied at such a rate that the aluminium trichloride was at all times equal to 2 percent by weight of the titanium tetrachloride. The following results were obtained: Mean particle diameter: 0.18 microns Percentage rutile: 100 percent Obscuring power determined by the Reynolds method: 2000.

EXAMPLE 3

The experiment was carried out by using the same procedures as in Example 1, the rutilizing agent and nucleant used being an organic complex of aluminium trichloride with alkyl benzenes having 12 to 16 carbon atoms in the lateral chain, obtained as described in Example 1, containing 38 percent aluminium trichloride and supplied at such a rate that the aluminium trichloride was at all times equal to 2 percent by weight with respect to the titanium tetrachloride. The following results were obtained:

Mean particle diameter: 0.20 microns
Percentage rutile: 100 percent
Obscuring power determined by the Reynolds method: 2,000.

EXAMPLE 4

The experiment was carried out by using the same procedures as in Example 1, the nucleant agent and rutilizing agent used being an organic complex of aluminium chloride in which the organic part consisted of toluene supplied at such a rate that at all times the aluminium trichloride equalled 2 percent by weight with respect to the titanium tetrachloride supplied. The following results were obtained:

Mean diameter of the particles of titanium dioxide: 0.25 microns
Percentage rutile: 100 percent
Obscuring power determined by the Reynolds method: 1950.

What we claim is:

1. Process for the manufacture of titanium dioxide pigments by oxidation of titanium tetrachloride with oxygen or with a gas containing oxygen, in the vapor phase and at 800°–1400°C, characterised by the use of a fluid organic complex of aluminium trichloride with an alkylbenzene or mixtures of these latter as the nucleant and rutilizing agent.

2. Process according to claim 1, characterised in that the rutilizing agent and nucleant used is a fluid organic complex of aluminium trichloride with an alkylbenzene or mixtures thereof, containing between 15 and 68 percent by weight of aluminium trichloride.

3. Process according to claim 1, characterized in that the fluid organic complex of aluminium trichloride used as a nucleant and rutilizing agent is supplied in such a quantity that the proportion by weight of aluminium chloride with respect to the titanium tetrachloride is comprised in the range of 0.5 to 3.5:1.

4. Process according to claim 1, characterised in that the fluid organic complex of aluminium trichloride used as a nucleant and rutilizing agent is supplied to the oxidation reactor in the form of a vapor or atomised liquid, possibly in mixture with the titanium tetrachloride vapor.

5. Process according to claim 1, characterized in that the alkylbenzene is toluene, ethylbenzene, butylbenzene, isopropylbenzene, alkylbenzene having a number of carbon atoms in the lateral chain of 12 to 16, or polyalkylbenzene, and mixtures thereof.

* * * * *